Sept. 7, 1943.  S. W. HAYES  2,328,803
MOWER
Filed Dec. 16, 1940   4 Sheets-Sheet 1

Sept. 7, 1943. S. W. HAYES 2,328,803
MOWER
Filed Dec. 16, 1940 4 Sheets-Sheet 2

Inventor
Stanley W. Hayes
By Williams, Bradbury & Hinkle
Attys

Sept. 7, 1943.　　　S. W. HAYES　　　2,328,803
MOWER
Filed Dec. 16, 1940　　　4 Sheets-Sheet 3
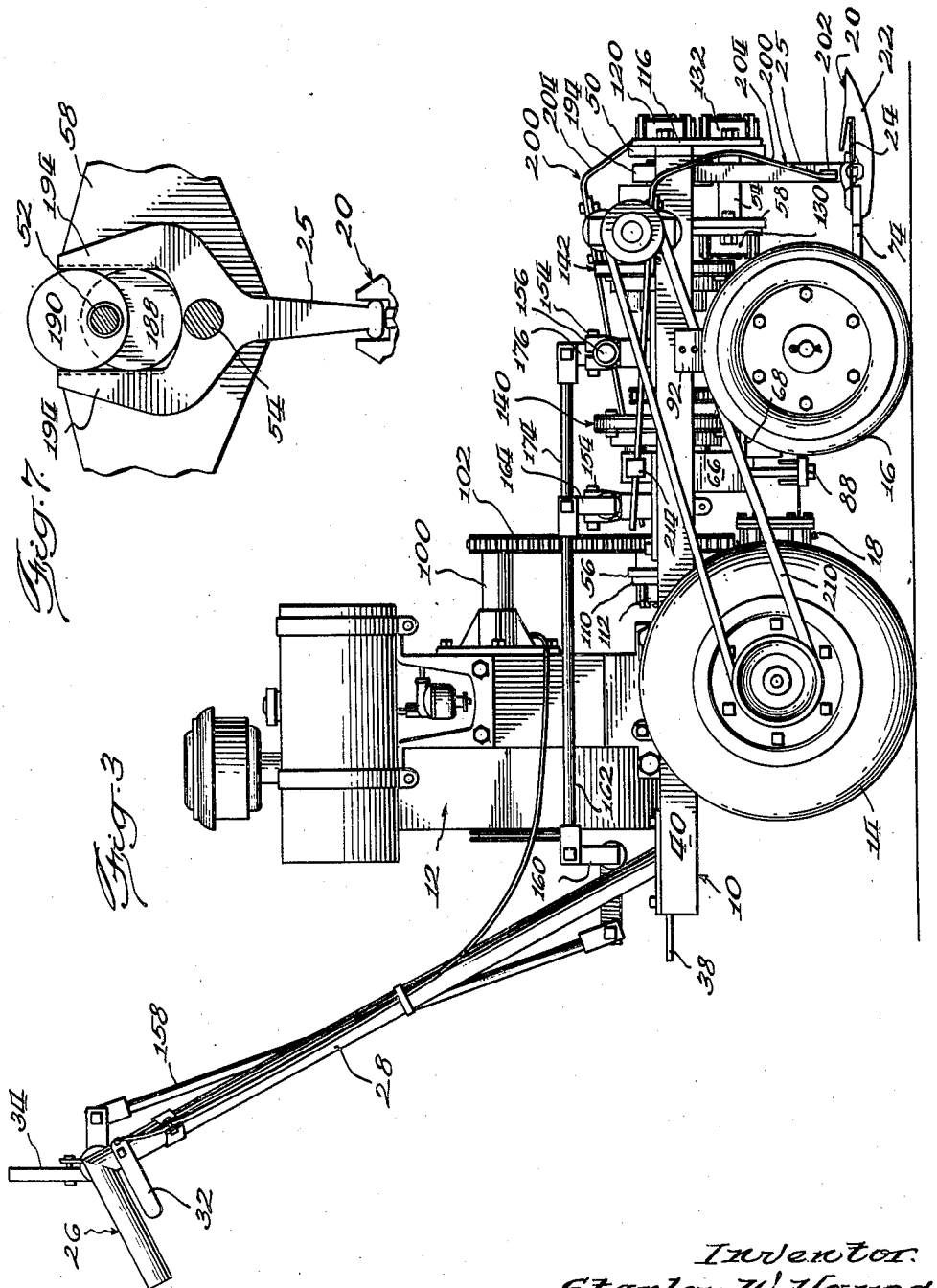
Inventor:
Stanley W. Hayes
By Williams, Bradbury & Hinkle
Attys.

Sept. 7, 1943.    S. W. HAYES    2,328,803
MOWER
Filed Dec. 16, 1940    4 Sheets-Sheet 4
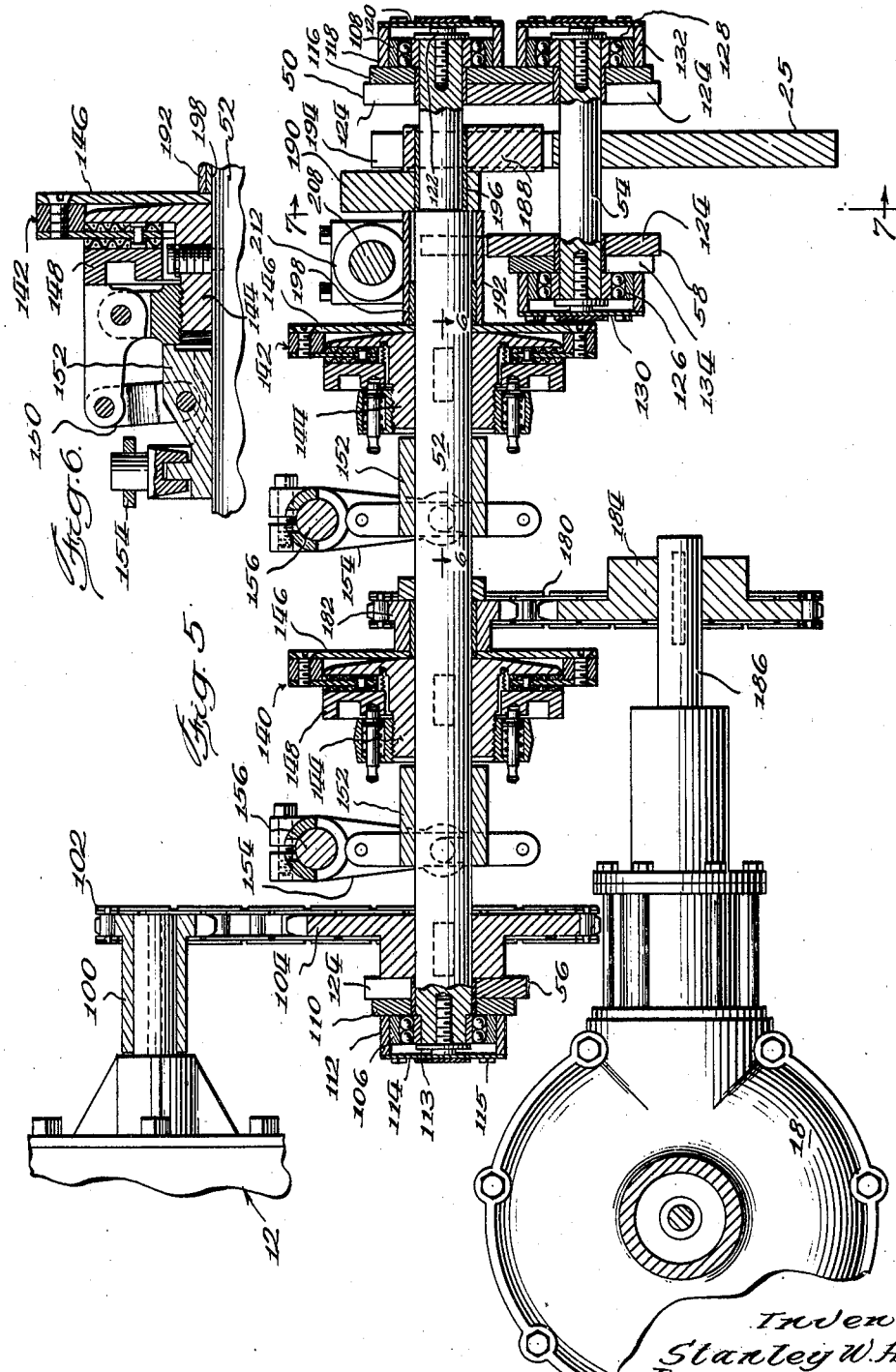
Inventor.
Stanley W. Hayes
By
Williams, Bradbury & Shinkle
Attys Patented Sept. 7, 1943

2,328,803

UNITED STATES PATENT OFFICE 2,328,803

MOWER

Stanley W. Hayes, Richmond, Ind., assignor to Hayes Track Appliance Company, Richmond, Ind., a corporation of Indiana Application December 16, 1940, Serial No. 370,238

15 Claims. (Cl. 56—26.5)

The present invention relates to mowers and more particularly to power operated mowers capable of both light and heavy duty operation, such as encountered in the mowing of large lawns, orchards, parks, and the like.

One of the objects of this invention is the provision of a new and improved, economical, simple and yet rugged, power operated mower.

Another object of this invention is the provision of a new and improved power operated mower provided with two manually controlled clutches through which power may be transmitted to the mower propelling means and to the cutting means.

Another object of the present invention resides in the construction and arrangement of parts through which the propelling and cutting means of the mower are driven.

Other objects and advantages of the present invention will become apparent from the ensuing description, in the course of which reference is had to the accompanying drawings, in which:

Fig. 3 is a side elevational view of the mower;

Fig. 4 is a side elevational view of the mower frame;

Fig. 5 is an enlarged axial cross-sectional view through the propelling and cutter actuating means, the view being taken along the line 5—5 of Fig. 1;

Fig. 6 is a fragmentary axial cross-sectional view taken along the line 6—6 of Fig. 5, illustrating further details of the clutch associated with the cutting means and Fig. 7 is a transverse cross-sectional view taken along the line 7—7 of Fig. 5, illustrating details of construction of the pitman utilized in driving the cutting means.

Figure 1:
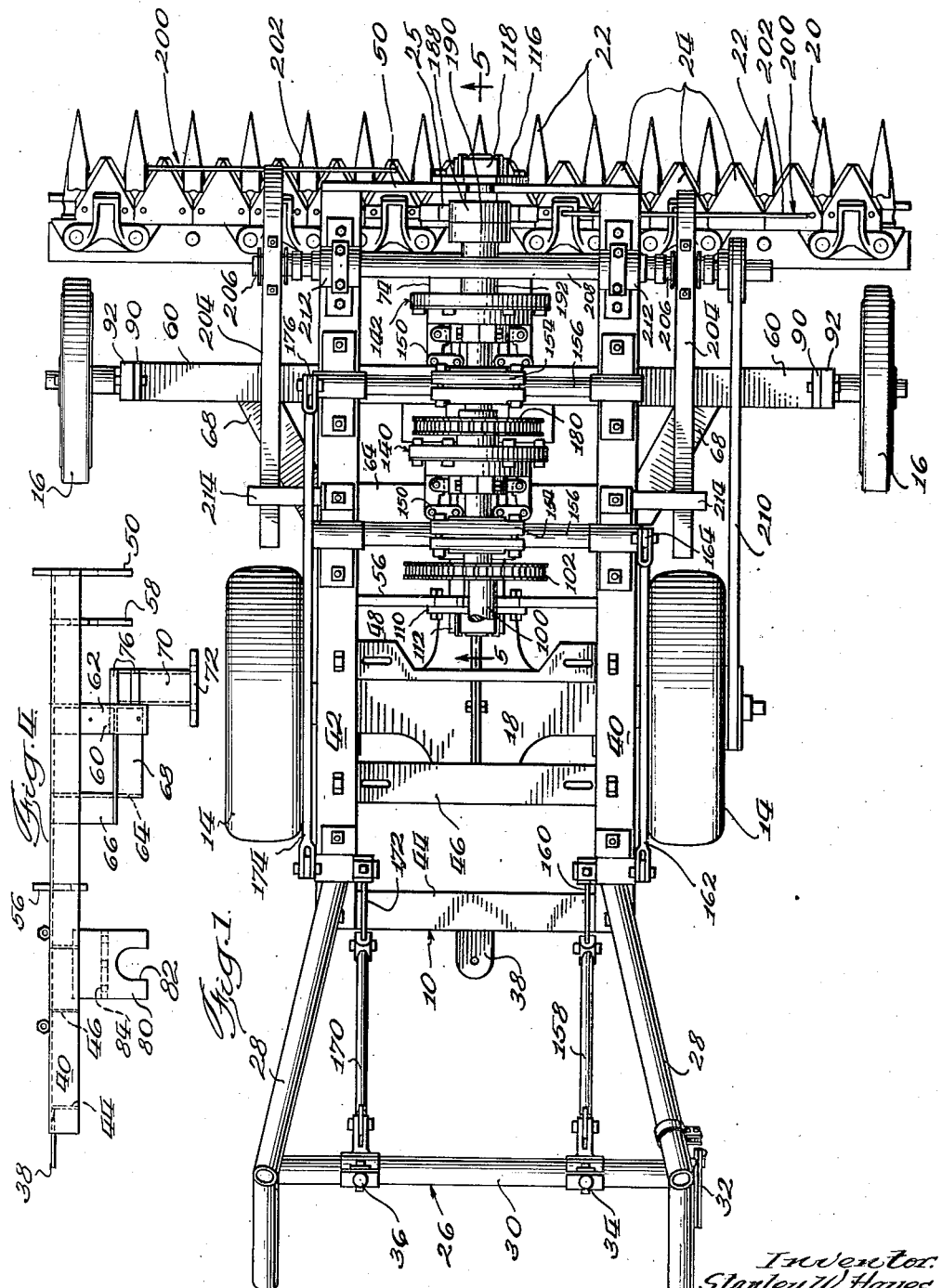
Fig. 1 is a top plan view of a mower constructed in accordance with the present invention. The motor for propelling the mower and cutting means has been omitted from this figure in order better to illustrate other details of construction.

Referring first to Figs. 1 to 4, inclusive, it may be seen that the mower comprises a frame, indicated generally by reference character 10, supporting a suitable source of power such as a gasoline motor, indicated generally by reference character 12 which may be of any suitable construction. The frame is supported upon rear and front wheels 14 and 16, respectively. The wheels 14 are driven through a differential transmission 18 (see Figs. 1 and 5) which may be of the type used in model T Fords or of any suitable type. The wheels 14 are spaced apart a lesser distance than the wheels 16 in order that the mower may be manipulated more readily and made to turn about a smaller radius. Both wheels are preferably provided with pneumatic tires as indicated.

The mower comprises cutting means, such as the sickle cutter indicated generally by reference character 20, and comprising fixed cutter bars 22 and horizontally reciprocable knives 24 reciprocated by an oscillatable pitman 25.

The mower is adapted to be guided by a handle 26 comprising a pair of spaced apart inclined tubular members 28 suitably secured to the rear end of the frame and a tubular crosspiece 30. A motor throttle controller 32 is attached to one of the members 28, while two clutch controllers 34 and 36, utilized for controlling the connection of the motor to the propelling means and to the cutter operating means, and to which further reference will be had shortly, are rotatably mounted on the crosspiece 30.

A sulky in which the operator can ride (not shown) may be attached to the mower frame by means of a hitch 38, or, if desired, the mower may be guided by an operator walking behind it.

Figure 2:
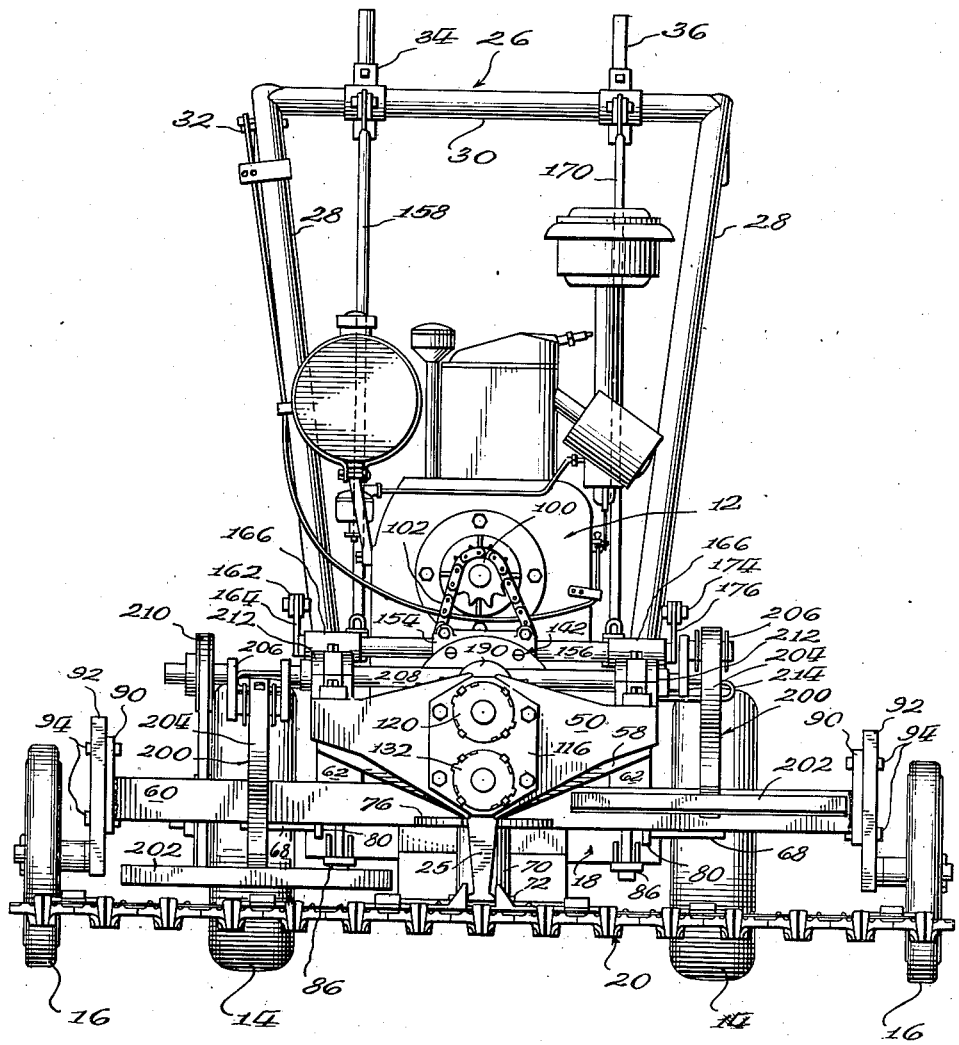
Fig. 2 is a front elevational view of the mower with motor attached.

Referring now more particularly to Figs. 1 and 4, it may be seen that the frame comprises a pair of longitudinally disposed frame members 40 and 42 of angle iron. The rear ends of these members are connected by an angle iron crosspiece 44, to which the hitch 38 is secured. Angle iron crosspieces 46 and 48 interconnecting the frame members 40 and 42 are utilized to support the motor 12. The front ends of frame members 40 and 42 are interconnected by a crosspiece 50, the generally diamond-shaped contour of which is best illustrated in Fig. 2, and which is also utilized to support the front ends of the main driven shaft 52 (hereinafter referred to as the propulsion shaft) and of the pitman supporting shaft 54, as best illustrated in Fig. 5. The rear end of the propulsion shaft is supported by a crosspiece 56 located approximately at the longitudinal center of the frame, and the rear end of the pitman shaft 54 is supported by a crosspiece 58 located a short distance behind the front crosspiece 50. Both of these crosspieces are secured as by welding to the frame members 40 and 42, as are the other crosspieces.

The front wheels 16 are secured to the frame by means of an angle iron support 60 suspended below frame members 40 and 42 by a pair of downwardly extending angle iron supports 62. Additional rigidity is given to the wheel support 60 by a crosspiece 64 supported below the frame members 40 and 42 by vertically disposed angle iron supports 66 and connected to support 60 by angularly disposed angle iron braces 68 (see Figs. 1 and 4). The sickle 20 is supported below the front end of the frame by supporting structure comprising a tubular post 70 terminating in a flange 72 that is bolted to a plate 74 mounting the sickle 20. The post is attached to the wheel support 60 by a pair of brackets 76 welded to the post and support, respectively.

The rear wheels and transmission are fixedly located with respect to the frame by downwardly extending plates 80, each having a substantially U-shaped slot 82 at its lower edge to receive the top of the transmission housing, and a horizontally disposed plate 84 welded on the inner side thereof above the slot. The transmission housing is attached to the frame by suitable clamping means, such as the bolts and plate indicated by reference character 86 in Fig. 2, cooperatively associated with the plates 84. Further support is given to the transmission by the hanger indicated by reference character 88 in Fig. 3, securing the drive shaft housing to the crosspiece 64.

The height of the cutter bar above ground is adjustable by means permitting adjustment of the front wheels relative to the frame. This means includes vertically disposed plates 90 secured to the outer ends of wheel support 60 and vertically disposed wheel supporting plates 92 which are provided with a number of openings to receive the attaching bolts 94, whereby the vertical locational relationship of the plates 90 and 92 may be readily adjusted.

The motor 12 is directly connected to propulsion shaft 52 through a chain drive comprising a sprocket 100 secured to the motor shaft, a chain 102, and a sprocket 104 secured to shaft 52 adjacent its rear end.

The propulsion shaft is journaled for rotation in ball bearings 106 and 108 secured to crosspieces 56 and 50, respectively. Bearing 106 is mounted in a housing defined by a plate 110 and a tubular member 112 welded thereto. Plate 110 is secured to crosspiece 56 by suitable means such as the bolts shown in Fig. 1. The inner bearing race is secured to the rear end of the shaft as by a washer and bolt 113 and the housing is completed by a cover plate 114 held in place by a plurality of clips 115. Bearing 108 is similarly mounted in a housing defined by plate 116, tubular member 118, and cover plate 120. Its inner race is secured to the front end of the shaft by a washer and bolt 122. Plate 116 is secured to crosspiece 50, preferably by a plurality of bolts as best illustrated in Fig. 2.

In order that shaft 52 may be readily assembled on the frame, the crosspieces 50 and 56 are provided with substantially U-shaped slots 124 centrally of their upper edges so that the shaft may be inserted therein.

The pitman shaft 54 is similarly mounted in spaced apart bearings 126 and 128 which are mounted in housings 130 and 132 corresponding in construction to those used in conjunction with the propulsion shaft. The previously referred to plate 116 is also used to support housing 132 on crosspiece 50, while another plate 134, similar to plate 110, is used to support housing 130 on crosspiece 58. The lower edges of crosspieces 50 and 58 are also provided with slots 124 in order that shaft 54 may readily be assembled on the frame.

The propulsion shaft is adapted to drive the rear wheels 14 through a clutch, indicated generally by reference character 140, and to drive the sickle 20 through a clutch 142. Both clutches are mounted on the propulsion shaft in order to conserve space, the clutch 140 being located back of clutch 142. These clutches are identical in construction and are illustrated as being of the twin disc type made by the Twin Disc Clutch Company. The particular construction of the clutches does not form any part of this invention, as long as they are carried by the propulsion shaft, and other types may be used.

Since the clutches are of identical construction, like reference characters will be used to indicate like parts of each. Each clutch comprises a hub portion 144 keyed to the propulsion shaft, a driven plate 146 having slight movement axially of the shaft in order to insure free release of the plate when the clutch is disengaged, and a member 148 movable axially to effect engagement and disengagement of the clutch. Member 148 is actuated through a pair of diametrically opposed toggle mechanisms 150, actuated in turn by a sleeve 152 surrounding and movable axially of the shaft. The sleeve is moved by a throw-out yoke 154 clamped to a rockshaft 156.

Clutch 140 is manually controlled by the previously referred to lever 34 rotatably secured to handle 28. This lever is connected to rockshaft 156 by a rod 158, crank 160, a rod 162, and crank arm 164. Crank 160 is pivotally secured to a handle portion 28 and crank arm 164 is secured directly to the end of rockshaft 156. The latter is rotatably mounted in bearings 166 mounted above frame members 40 and 42 by tubular supports 168.

Clutch 142 is manually controlled by the previously referred to lever 36 also rotatably secured to handle 26. This lever is connected to rockshaft 156 by a rod 170, crank 172, rod 174 and crank arm 176. Crank 172 is pivotally secured to the other handle portion 28 and crank arm 176 is secured directly to the end of rockshaft 156. The latter is rotatably mounted in bearings 166 just as the rockshaft 156 associated with clutch 140.

The rear wheels 14 of the mower are operatively connected to clutch 140 by a chain 180 interconnecting a sprocket 182 attached to the driven plate 146 of the clutch and a sprocket 184 secured to the drive shaft 186 leading to the transmission 18, as best illustrated in Fig. 5. Thus, when the motor is in operation and the clutch engaged, the propulsion shaft is effective to drive the mower through the clutch and driving connection just described.

The sickle operating pitman 25 is operatively connected to clutch 142 through a cam 188, a counter-weight 190, and a tubular member 192 welded at opposite ends to the counter-weight 190 and the driven plate 146 of the clutch, as best illustrated in Fig. 5. The cam 188 oscillates the pitman 25 by reason of its location between the bifurcated ends 194 of the latter, as best illustrated in Fig. 7. Cam 188 and counter-weight 190 are of identical construction and so located that their centers of gravity are on diametrically opposite sides of shaft 52. The cam and counter-weight and tubular member 192 are provided with bearing bushings 196 and 198, respectively. When the clutch 142 is engaged, the propulsion shaft rotates cam 188 and the latter imparts an oscillatory movement to the pitman 25, and the latter in turn imparts reciprocating movement to the cutter blade 24 of the sickle 20.

In order to prevent weeds or heavy grass from interfering with the operation of the cutter, the latter has cooperatively associated with it a pair of tedders, indicated generally by reference characters 200. The construction and arrangement of the tedders is disclosed and claimed in my copending divisional application Serial No. 423,493, filed December 18, 1941. Each of the tedders comprises a horizontally disposed bar 202 movable toward and away from as well as rearwardly across the top of the sickle by a slightly resilient metallic actuating arm 204 to which movement is imparted by crank arms 206 formed at the opposite ends of a crankshaft 208 rotated slowly from one of the rear wheels 14 by a belt 210 and suitable pulleys. The crankshaft is mounted above the frame in bearings 212 secured above frame members 40 and 42. The actuating arms 204, which extend generally upwardly and then rearwardly from the tedder bars 202, are operatively secured to the crank arms 206 by means of short straps encircling the latter. The rear ends of actuating members 204 are movably mounted in U-shaped straps 214 secured to and extending laterally from frame members 40 and 42.

The mower of the present invention is, as evidenced by the foregoing detailed description thereof, adapted simply and economically to be fabricated from parts cut, for the most part, from plate, tubular, or angle iron structural elements. The construction is rugged and will withstand heavy use by reason of its simplified construction.

The use of two clutches associated with a single propulsion shaft driven directly by the motor enables the mower to be built as a compact unit and also gives the operator control over both the forward movement of the mower and the sickle.

In operation, the motor is first started and its speed thereafter controlled by the throttle controller 32 which is readily accessible to the operator as it is, like the clutch controls, mounted on the handle 26. When it is desired to have the mower move forward, it is necessary only to operate clutch controller 34 to effect engagement of clutch 140. Engagement of this clutch, as heretofore described in detail, operatively connects the motor to the rear wheels so that the mower is propelled forward. When it is desired to place the cutter in operation, it is necessary only to effect engagement of clutch 142 by operation of clutch controller 36.

The tedders 200 are operated whenever the motor moves by reason of their actuation from the rear wheels through the belt 210. The tedders are effective to prevent clogging of the cutter by heavy grass or weeds and the like, and it has been found in practice that their use enables heavy, wet grass, like blue grass, to be cut with ease.

Although the invention has been disclosed in connection with the specific details of a preferred embodiment thereof, it should be understood that such details are not intended to be limitative of the invention, except in so far as set forth in the accompanying claims.

Having thus described my invention, what I claim as new and desire to secure by Letters Patent of the United States is:

1. In a motor operated mower, the combination including, a frame, a shaft driven by the motor mounted for rotation on said frame, a pair of clutches associated with said shaft, each comprising a first member driven directly by said shaft and a second member rotatable about said shaft and adapted to be driven by said first member, means driven by the second member of one clutch for propelling the mower, and means including a cam journaled on said shaft driven by the second member of the other clutch for actuating cutting means associated with the mower.

2. In a motor operated mower of the type having a reciprocable sickle cutter, the combination including, a frame, a shaft driven by the motor mounted for rotation on said frame, a pair of clutches associated with said shaft, each comprising a first member driven directly by said shaft and a second member rotatable about said shaft and adapted to be driven by said first member, means driven by the second member of one clutch for propelling the mower, and means including an oscillatable member driven directly by the second member of the other clutch for reciprocating the sickle cutter.

3. In a motor operated mower having a reciprocable sickle cutter, the combination including, a frame, a shaft mounted for rotation about a horizontal axis on said frame and rotatable by said motor, a pair of clutches associated with said shaft, said clutches being spaced apart axially of said shaft, means adapted to be driven through one of said clutches for propelling the mower, a second shaft mounted for oscillation about a horizontal axis located below the first mentioned shaft, a pitman secured to said second shaft, means adapted to be rotated through said other clutch for oscillating said pitman, and means operatively connecting said pitman to the reciprocable cutter.

4. In a motor operated mower having a reciprocable sickle cutter, the combination including, a frame, a shaft mounted for rotation about a horizontal axis on said frame and rotatable by said motor, a pair of clutches associated with said shaft, said clutches being spaced apart axially of and located intermediate the ends of said shaft, a transmission and drive shaft located below and to the rear of the rearmost clutch, means adapted to be driven through said rearmost clutch for driving said drive shaft to propel the mower, a second shaft mounted for oscillation about a horizontal axis located below the first mentioned shaft and in front of the other of said clutches, a pitman secured to said second shaft, means adapted to be rotated through said other clutch for oscillating said pitman, and means operatively connecting said pitman to the reciprocable cutter.

5. In a motor operated mower having a reciprocable sickle cutter, the combination including, a frame, a shaft mounted for rotation about a horizontal axis on said frame and rotatable by said motor, a pair of disc clutches associated with said shaft, said clutches being spaced apart axially of said shaft, means adapted to be driven through the rearmost one of said clutches for propelling the mower, a second shaft mounted for oscillation about a horizontal axis located below the first mentioned shaft and in front of the other of said clutches, a pitman secured to said second shaft, means including a cam journaled on said first mentioned shaft and rotatable through said other clutch by a tubular member surrounding said first shaft and connected to said clutch for oscillating said pitman, and means operatively connecting said pitman to the reciprocable cutter.

6. In a motor operated mower having a reciprocable sickle cutter, the combination including, a frame, a shaft mounted for rotation about a horizontal axis on said frame and rotatable by said motor, a pair of disc clutches associated with said shaft, said clutches being spaced apart axially of said shaft, means adapted to be driven through the rearmost one of said clutches for propelling the mower, a second shaft mounted for oscillation about a horizontal axis located below the first mentioned shaft and in front of the other of said clutches, a pitman secured to said second shaft, said pitman having a pair of bifurcated arms extending above said first mentioned shaft, means including a cam journaled on said first mentioned shaft between the arms of said pitman and rotatable through said other clutch by a tubular member surrounding said first shaft and connected to said clutch for oscillating said pitman, and means operatively connecting said pitman to the reciprocable cutter.

7. In a motor operated mower having a reciprocable sickle cutter, the combination including, a frame comprising a pair of spaced apart longitudinal members and a pair of spaced apart crosspieces, a shaft mounted for rotation about a horizontal axis on said crosspieces and rotatable by said motor, a pair of disc clutches associated with said shaft, said clutches being spaced apart axially of said shaft and located between said crosspieces, means adapted to be driven through the rearmost one of said clutches for propelling the mower, a third crosspiece located between said pair of crosspieces and near the crosspiece nearest the front of the mower, a second shaft mounted for oscillation about a horizontal axis on said third crosspiece and the crosspiece nearest the front of the mower, said second shaft being below the first mentioned shaft and in front of the other of said clutches, a pitman secured to said second shaft, means including a cam journaled on said first mentioned shaft and rotatable through said other clutch by a tubular member surrounding said first shaft and connected to said clutch for oscillating said pitman, and means operatively connecting said pitman to the reciprocable cutter.

8. A mower according to claim 7, wherein the first shaft is positioned in substantially U-shaped slots cut in the upper edges of the pair of crosspieces and the second shaft is positioned in similar slots cut in the lower edges of the third and front crosspieces, whereby said shafts may be readily positioned in said crosspieces.

9. A mower according to claim 7, wherein the shafts are secured to said crosspieces by bearings supported on plates fastened to said crosspieces.

10. In apparatus of the class described, a frame for supporting a pair of shafts, including in combination, a pair of spaced apart substantially horizontally disposed longitudinal members, a pair of crosspieces interconnecting said members, one of said crosspieces being located near the middle of said members and the other at the front thereof, and a third crosspiece intermediate said pair of crosspieces and located nearer the front crosspiece, said pair of crosspieces having substantially U-shaped vertically disposed slots on their upper edges to receive one of said shafts, and said third and front crosspieces having similar slots on their lower edges to receive the other of said shafts.

11. In a motor operated mower having a reciprocable sickle cutter, the combination including, a frame, a shaft mounted on said frame and rotatable by said motor, a pair of clutches associated with said shaft, said clutches being spaced apart axially of and located intermediate the ends of said shaft, a transmission and drive shaft, means adapted to be driven through one of said clutches for driving said drive shaft to propel said mower, a second shaft mounted for oscillation about its longitudinal axis, a pitman secured to said second shaft, means adapted to be rotated through the second clutch for oscillating said pitman, and means operatively connecting said pitman to the reciprocable cutter.

12. In a motor operated mower having a reciprocable sickle cutter, the combination including, a frame, a shaft mounted on said frame and rotatable by said motor, a pair of disc clutches associated with said shaft, said clutches being spaced apart axially of said shaft, means adapted to be driven through one of said clutches for propelling the mower, a second shaft mounted for oscillation about its longitudinal axis, a pitman secured to said second shaft, means including a cam journaled on said first mentioned shaft and rotatable through said second clutch by a tubular member surrounding said first shaft and connected to said second clutch for oscillating said pitman, and means operatively connecting said pitman to the reciprocable cutter.

13. In a motor operated reciprocable sickle type mower having a motor driven shaft with a pair of clutches mounted thereon, means for reciprocating said sickle comprising a second shaft mounted for oscillation about a horizontal axis located below the first mentioned shaft, a pitman secured to said second shaft, means adapted to be rotated through one of said clutches for oscillating said pitman, and means operatively connecting said pitman to the reciprocable sickle.

14. In a motor operated reciprocable sickle cutter type mower having a motor driven shaft with a pair of clutches mounted thereon, means for reciprocating said cutter comprising a second shaft mounted for oscillation about a horizontal axis located below the first mentioned shaft, a pitman secured to said second shaft, a cam journaled on said first mentioned shaft, a tubular member surrounding said first shaft, said tubular member having its opposite ends secured to said cam and to the driven member of one of said clutches whereby said cam is rotated and oscillates said pitman when said clutch is engaged, and means operatively connecting said pitman to said reciprocable cutter.

15. In a motor operated reciprocable sickle cutter type mower having a motor driven shaft with a pair of clutches mounted thereon, means for reciprocating said cutter comprising a second shaft mounted for oscillation about a horizontal axis located below the first mentioned shaft, a pitman secured to said second shaft, said pitman having a pair of arms extending above said first mentioned shaft, a cam journaled on said first mentioned shaft between the arms of said pitman, a tubular member surrounding said first mentioned shaft, said tubular member having its opposite ends secured to said cam and to the driven member of one of said clutches whereby said cam is rotated and oscillates said pitman when said clutch is engaged, and means operatively connecting said pitman to the reciprocable cutter.

STANLEY W. HAYES.